US009934258B2

(12) United States Patent
Fuglsang et al.

(10) Patent No.: US 9,934,258 B2
(45) Date of Patent: Apr. 3, 2018

(54) DYNAMIC GENERATION OF DATABASE VIEWS AND CLASS OBJECTS FOR PROVIDING ACCESS TO REPOSITORY DATA

(71) Applicant: Oracle International Corporation, Redwood Shores, CA (US)

(72) Inventors: Dennis Floyd Fuglsang, Ballwin, MO (US); Joshua Jeffrey Spiegel, St. Louis, MO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 178 days.

(21) Appl. No.: 14/230,627

(22) Filed: Mar. 31, 2014

(65) Prior Publication Data
US 2015/0278314 A1 Oct. 1, 2015

(51) Int. Cl.
*G06F 7/00* (2006.01)
*G06F 17/30* (2006.01)

(52) U.S. Cl.
CPC .............. *G06F 17/30292* (2013.01)

(58) Field of Classification Search
CPC ......... G06F 17/30312; G06F 17/30864; G06F 17/30386; G06F 17/30424; H04L 67/10
USPC ....................................................... 707/736
See application file for complete search history.

(56) References Cited

U.S. PATENT DOCUMENTS

| | | | |
|---|---|---|---|
| 6,199,059 B1 * | 3/2001 | Dahan | G06F 17/30392 |
| 6,917,930 B1 | 7/2005 | Brodale et al. | |
| 8,401,991 B2 * | 3/2013 | Wu | G06F 17/30286 707/602 |
| 8,583,549 B1 | 11/2013 | Mohsenzadeh | |
| 2006/0155692 A1 * | 7/2006 | Dettinger | G06F 17/30398 |
| 2009/0144696 A1 | 6/2009 | Andersen | |
| 2010/0070448 A1 * | 3/2010 | Omoigui | H01L 27/1463 706/47 |
| 2010/0088317 A1 * | 4/2010 | Bone | G06F 17/30144 707/737 |

(Continued)

FOREIGN PATENT DOCUMENTS

WO 2013/115985 A2 8/2013

*Primary Examiner* — Hosain Alam
*Assistant Examiner* — Nicholas Allen
(74) *Attorney, Agent, or Firm* — Kilpatrick Townsend & Stockton LLP

(57) ABSTRACT

Techniques for dynamically generating database views and class objects for allowing access to domain data stored in a repository are provided. A computer-implemented method, a system, and/or a machine-readable medium storing instructions executable by one or more processors may include generating a database view and a class object using metadata included in a domain model, and retrieving domain data from a repository using the database view and the class object. For example, a method may include obtaining a domain model from a repository, the domain model including metadata corresponding to a set of domain data stored in the repository, generating a database view of a subset of the set of domain data using the metadata, generating a class object for the subset using the metadata, generating mapping information, and retrieving the subset of domain data from the repository using the database view, the class object, and the mapping information.

16 Claims, 10 Drawing Sheets

(56) References Cited

U.S. PATENT DOCUMENTS

| | | | |
|---|---|---|---|
| 2010/0114899 A1* | 5/2010 | Guha | G06F 17/30867 707/741 |
| 2010/0299327 A1* | 11/2010 | Kiefer | G06F 17/30932 707/736 |
| 2011/0153505 A1* | 6/2011 | Brunswig | G06Q 10/06 705/301 |
| 2011/0295624 A1* | 12/2011 | Chapin | G06Q 40/08 705/4 |
| 2012/0166443 A1* | 6/2012 | Bloesch | G06F 17/30595 707/740 |
| 2012/0197849 A1* | 8/2012 | Srinivasa | G06F 17/30427 707/687 |
| 2012/0303668 A1* | 11/2012 | Srinivasan | G06F 17/30292 707/792 |
| 2013/0013638 A1* | 1/2013 | Paulisch | G06F 17/30554 707/770 |
| 2013/0117313 A1* | 5/2013 | Miao | G06F 21/6227 707/781 |
| 2013/0151491 A1* | 6/2013 | Gislason | G06F 17/30339 707/696 |
| 2015/0278314 A1* | 10/2015 | Fuglsang | G06F 17/30554 707/736 |

* cited by examiner

| 300 | | | | |
|---|---|---|---|---|
| | TYPE 1 | | | |
| CD1 | CD1 TITLE | CD1 ARTIST | CD1 TRACK 1 | CD1 TRACK 2 | CD1 TRACK 3 | ⋮ |
| CD2 | CD2 TITLE | CD2 ARTIST | CD2 TRACK 1 | CD2 TRACK 2 | CD2 TRACK 3 | ⋮ |
| CD3 | CD3 TITLE | CD3 ARTIST | CD3 TRACK 1 | CD3 TRACK 2 | CD3 TRACK 3 | ⋮ |

FIG. 3

```
SELECT i.INSTANCE_UUID AS "INSTANCE_UUID", i.CORRELATION_GROUP_UUID AS "CORRELATION_GROUP_UUID",
i.TYPE_UUID AS "TYPE_UUID", i.HERITAGE_UUID AS "HERITAGE_UUID", i.NAME AS "NAME", i.REALNAME AS "REALNAME",
i.NAMESPACE AS "NAMESPACE", i.READ_ONLY AS "READ_ONLY", i.SYSTEM_DEFINED AS "SYSTEM_DEFINED", i.CREATED_BY AS "CREATED_BY",
i.UPDATED_BY AS "UPDATED_BY", i.CORRELATION_ID AS "CORRELATION_ID", i.PROXY_URI AS "PROXY_URI", i.SOURCEKEYS AS "SOURCEKEYS",
i.KEYWORDS AS "KEYWORDS", i.CREATED_TIME AS "CREATED_TIME", i.UPDATED_TIME AS "UPDATED_TIME", i.DESCRIPTION AS "DESCRIPTION",
i.OPTLOCK AS "OPTLOCK", i.ENTERPRISE_ID AS "ENTERPRISE_ID",
av1.VARCHAR_VALUE AS "A01",
av2.VARCHAR_VALUE AS "A02",
av3.VARCHAR_VALUE AS "A03",
av4.VARCHAR_VALUE AS "A04",
av5.INTEGER_VALUE AS "A05",
av6.VARCHAR_VALUE AS "A06",
av7.VARCHAR_VALUE AS "A07"
FROM INSTANCES i
JOIN (SELECT VARCHAR_VALUE, INSTANCE_UUID FROM ATTRIB_VALUES WHERE ATTRDEFN_UUID='8C071895-5b08-4ec3-baeb-b8dcc801f742') av1
ON i.INSTANCE_UUID=av1.INSTANCE_UUID
JOIN (SELECT VARCHAR_VALUE, INSTANCE_UUID FROM ATTRIB_VALUES WHERE ATTRDEFN_UUID='51aa3f41-234d-4539-b686-69086da07b85') av2
ON i.INSTANCE_UUID=av2.INSTANCE_UUID
JOIN (SELECT VARCHAR_VALUE, INSTANCE_UUID FROM ATTRIB_VALUES WHERE ATTRDEFN_UUID='5c96d8df-b488-44d2-a7f8-1c58a9d6b9ce') av3
ON i.INSTANCE_UUID=av3.INSTANCE_UUID
JOIN (SELECT VARCHAR_VALUE, INSTANCE_UUID FROM ATTRIB_VALUES WHERE ATTRDEFN_UUID='1de10a59-7035-4ef2-9788-746e429eaddb') av4
ON i.INSTANCE_UUID=av4.INSTANCE_UUID
JOIN (SELECT INTEGER_VALUE, INSTANCE_UUID FROM ATTRIB_VALUES WHERE ATTRDEFN_UUID='94e2078f-821c-4365-8ebd-b0a914610277') av5
ON i.INSTANCE_UUID=av5.INSTANCE_UUID
JOIN (SELECT VARCHAR_VALUE, INSTANCE_UUID FROM ATTRIB_VALUES WHERE ATTRDEFN_UUID='fe31a23e-c385-4b9d-8dea-33e2e663d7d3') av6
ON i.INSTANCE_UUID=av6.INSTANCE_UUID
JOIN (SELECT VARCHAR_VALUE, INSTANCE_UUID FROM ATTRIB_VALUES WHERE ATTRDEFN_UUID='c2d2550e-1496-4e02-99ce-ad5243dffa33') av7
ON i.INSTANCE_UUID=av7.INSTANCE_UUID
WHERE i.TYPE_UUID IN ('fa966752-9216-4a25-aadf-78a06041.5a5a', 'af401f9-035a-48ba-ab30-8596e7427320', 'f12f759e-86d2-4169-9841-af17a9695358');
```

FIG. 4

DYNAMIC GENERATION OF DATABASE VIEWS AND CLASS OBJECTS FOR PROVIDING ACCESS TO REPOSITORY DATA

FIELD

The present disclosure relates generally to providing access to domain data stored in a repository, and more particularly to techniques for dynamically generating database views and class objects for providing access to domain data stored in a repository.

BACKGROUND

Data repositories may store data using generic schemas with loosely typed tables that have no clear correspondences among related data and metadata. For example, in an effort to facilitate configurability and model evolution, repository products may provide a meta-model with a loosely typed schema (e.g., no relational correspondences among related data and metadata) for describing assets registered in the repository. Storing the data using a loosely typed schema may provide the benefit of allowing customers to make changes to the models that are shipped with the repository by adding their own attributes, adding new metadata entity types, and/or making other changes. However, relational tools may not work on a repository that uses a loosely typed schema to store data in the repository. For example, reporting tools may not be capable of reporting on metadata stored using a loosely typed schema. Furthermore, the generic nature of the repository tables may make it difficult for a user to directly query the repository data using specific terminology that was used to create a model of the repository data.

BRIEF SUMMARY

Techniques are described for dynamically generating database views and class objects for providing access to domain data stored in a repository. For example, database views, class objects, and mapping information between each database view and corresponding class object may be generated using metadata from the repository. The database views, class objects, and mapping information may be used to process a user query to retrieve data from the repository that corresponds to the user query.

In some examples, a user may create a domain model that defines data the user wants stored in a repository. A domain model may be created for any type of data, such as software programs, music data, service data, and/or any other type of data a user wishes to define. The domain model may include metadata defining the domain data stored in the repository according to the user-defined domain model. For example, the metadata may define different domain types (e.g., types of software, types of music, types of services, and/or any other type that the user may define) and attribute definitions (e.g., characteristics of each type) for the data. The domain model may be defined by the user using terminology specific to the user's preferences. However, for reasons described herein, the domain data and metadata may be stored in the repository in a generic structure using loosely typed tables with no correspondence to the domain model (e.g., no relational correspondences between the data, the domain types, and the attributes of each domain type). In order to allow the user to query the domain data using domain-specific terms, the metadata included in the domain model may be used to dynamically generate database views that represent the data in a format specific to the domain model. The metadata may also be used to dynamically generate class objects that correspond to the data represented by the database views. For example, a database view and a class object may be generated for each domain type. Mapping information between each database view and a corresponding class object may then be generated.

In some examples, the database views, class objects, and mapping information may be used to process a user query to retrieve data from the repository that corresponds to the user query. The user query is in terms specific to the domain model created by the user. For example, a domain type may be determined from the user query. A class object for the domain type may be identified, and the mapping information for the class object may be used to identify the corresponding database view. The database view is then queried in order to retrieve the data that the database view represents. Accordingly, a user may query the generically stored data in the repository using terms specific to the user's domain model.

According to at least one example, a computer-implemented method may be provided that includes obtaining a domain model from a repository, the domain model including metadata corresponding to a set of domain data stored in the repository. The method may further include generating a database view of a subset of the set of domain data using the metadata, the database view including a query statement referencing the subset of domain data. The method may further include generating a class object for the subset of domain data using the metadata and generating mapping information by mapping the generated database view to the generated class object. The method may further include retrieving the subset of domain data from the repository using the database view, the class object, and the mapping information.

In some embodiments, the metadata of the domain model defines one or more domain types and one or more attribute definitions for the set of domain data stored in the repository.

In some embodiments, the method further comprises generating a class object and a database view for each domain type of the one or more domain types. In some embodiments, the method further comprises: receiving, by the computing device, a user query for the subset of domain data; determining, by the computing device, a domain type from the user query, the domain type corresponding to a domain type of the subset of domain data defined by the metadata; determining, by the computing device, the class object for the subset of data based on the domain type determined from the user query; determining, by the computing device, the database view of the subset of data using the mapping information between the class object and the database view; and performing a query on the database view to retrieve the subset of domain data from the repository. In some embodiments, the method further comprises: translating the user query into a structured query language statement using the class object, wherein performing the query on the database view includes performing the structured query language statement on the database view to retrieve the subset of domain data from the repository; and outputting the subset of domain data as a result of the user query.

In some embodiments, the query statement is performed on the set of domain data stored in the repository to retrieve the subset of domain data referenced by the database view. In some embodiments, the query statement includes a structured query language statement.

In some embodiments, the set of domain data is stored in the repository in a generic structure with no correspondence to the domain model, and wherein the database view represents the subset of domain data as a virtual table with a specific structure corresponding to the domain model.

In some embodiments, a system may be provided that includes a memory storing a plurality of instructions and one or more processors. The one or more processors may be configurable to obtain a domain model from a repository, the domain model including metadata corresponding to a set of domain data stored in the repository. The one or more processors may be further configurable to generate a database view of a subset of the set of domain data using the metadata, the database view including a query statement referencing the subset of domain data. The one or more processors may be further configurable to generate a class object for the subset of domain data using the metadata and to generate mapping information by mapping the generated database view to the generated class object. The one or more processors may be further configurable to retrieve the subset of domain data from the repository using the database view, the class object, and the mapping information.

In some embodiments, a machine-readable medium storing a plurality of instructions executable by one or more processors may be provided, wherein the plurality of instructions may include instructions that cause the one or more processors to obtain a domain model from a repository, the domain model including metadata corresponding to a set of domain data stored in the repository. The instructions may further include instructions that cause the one or more processors to generate a database view of a subset of the set of domain data using the metadata, the database view including a query statement referencing the subset of domain data. The instructions may further include instructions that cause the one or more processors to generate a class object for the subset of domain data using the metadata and to generate mapping information by mapping the generated database view to the generated class object. The instructions may further include instructions that cause the one or more processors to retrieve the subset of domain data from the repository using the database view, the class object, and the mapping information.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 3 shows an example of a database view in accordance with an embodiment.

FIG. 4 shows an example of a query statement defining a database view in accordance with an embodiment.

DETAILED DESCRIPTION

Figure 1:
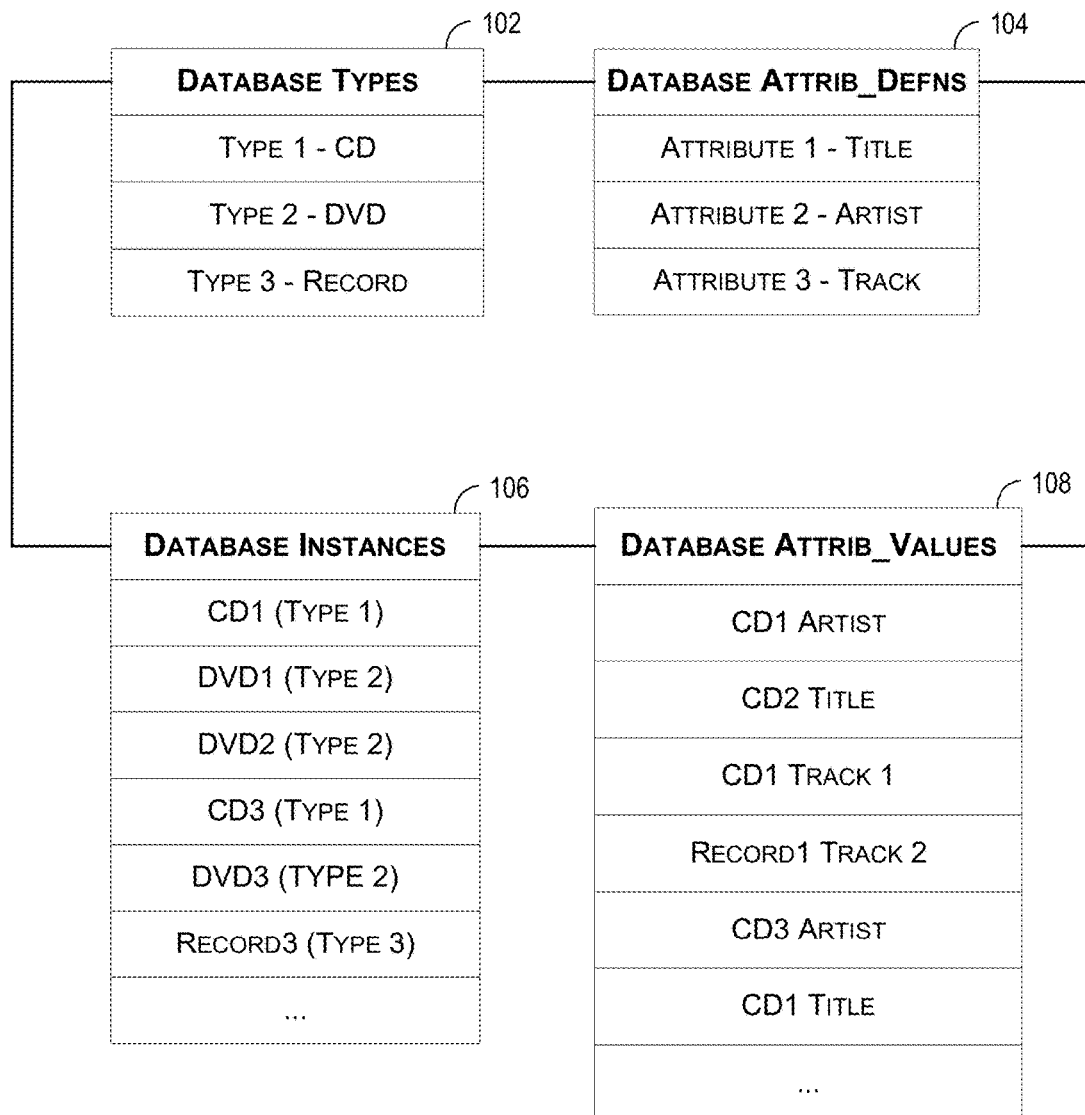
FIG. 1 shows an example of a loosely typed repository schema including tables with domain model metadata and domain data in accordance with an embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, and various other mediums capable of storing, containing or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

An enterprise repository system may allow a user to create a domain model that defines data the user wants stored in a repository. For example, a domain model may be created in the form of an UML (Unified Modeling Language) Class diagram using a UML modeling tool, such as JDeveloper by Oracle International Corporation. The domain model may include UML Classes, UML properties, and UML associations. Each UML Class represents a domain type, each UML Property represents an attribute of a domain type, and each UML Association represents a relationship between domain types. In some embodiments, modeling domains using UML may provide a graphical or otherwise visual depiction of the domain concepts, their metadata, and how they are related to one another.

A user may create a domain model for any type of data. For example, a domain model can be created for modeling software programs, music data, service data, and/or any other type of data a user wants to define. The domain model may be defined by the user using terminology specific to the user's preferences. For example, the user may create a domain model for a collection of music, including compact discs (CDs), digital versatile discs (DVDs), records, MPEG audio files (MP3s), tapes, or any other medium for storing music. Each of the items may be defined using specific terminology, such as title, artist names, track names, or the like. However, the domain model and/or the underlying data may be stored in the repository in a generic structure using loosely typed tables with no correspondence to the domain model (e.g., no relational correspondences between the different descriptions or definitions of each item stored in the repository). There are advantages to storing the data in the repository in a loosely typed manner. For example, users may make changes to metadata models that are shipped with the repository by adding their own attributes, adding new metadata entity types, and/or making other related changes. A disadvantage of generically storing the domain model and data includes difficulty for a user to directly query the data in the repository using the specific terminology they used to create the model of their domain data. Furthermore, relational tools may not work on a repository that uses a loosely typed schema to store data in the repository. For example, reporting tools may not be capable of reporting on metadata stored using a loosely typed schema. Accordingly, various techniques are needed to provide ways of querying and using metadata and data stored generically in the repository as if the data was stored in a structure corresponding to the domain model.

FIG. 1 illustrates an example of a group of loosely typed tables 102, 104, 106, and 108 with information related to a domain model that defines a set of domain data stored in a repository. The tables may be part of a schema of the repository. The examples provided in FIG. 1 relate to a domain model defining music items, such as CDs, DVDs, records, MP3s, tapes, and/or the like. While embodiments described in FIG. 1 include reference to music data and metadata, one of ordinary skill in the art would understand that the principles described herein apply equally to other types of data, including software, services, consumer electronic products, inventory of a business, and/or the like.

The tables 102 and 104 include domain model metadata that defines or describes domain data included in tables 106 and 108. For example, the metadata in Database Types table 102 may define different domain database types, such as Type 1—CD, Type 2—DVD, and Type 3—Record. One of ordinary skill in the art will understand that other exemplary domain types may be defined, such as a third type for MP3s, a fourth type for tapes, and/or the like. In some embodiments, the database types may be defined by the user when the user is creating the domain model. In some embodiments, the user may select from a set of predefined types that relate to a category of the domain data. For example, the user may be presented with a list of different music storage media (e.g., CD, DVD, record, MP3, tape, or the like) and the user may select the applicable types.

The Database Attrib_Defns table 104 includes metadata defining attribute definitions for different characteristics of each domain database type. The attribute definitions may include Attribute 1—Title, Attribute 2—Artist, Attribute 3—Track. One of ordinary skill in the art will understand that other exemplary domain types may be defined, such as length of album, length of track, names of all band members, bonus material (e.g., videos of interviews with the artist(s), and/or the like. In some embodiments, the attribute definitions are defined by the user when the user is creating the domain model. In some embodiments, the attribute definitions may be automatically created based on the defined domain database types. For example, if the type is a CD, all relevant attributes for a CD may be given an attribute definition (e.g., title, artist, track, track length, or the like). A user may then add or delete any attribute definitions that the user wants to include or does not want included in their domain model.

The actual domain data is included in tables 106 and 108. Database Instances table 106 includes instances of each domain database type. For example, the data for the CDs (Type 1), DVDs (Type 2), and Records (Type 3) that are included in the user's domain are stored in the Database Instances table 106. While examples of instances are shown to include CD1 (Type 1), DVD1 (Type 2), DVD2 (Type 2), etc., one of ordinary skill in the art will understand that the table 106 may include all instances of each domain database type. In some embodiments, more than one table may be used to store the database instances.

Database Attrib_Values table 108 includes the data corresponding to each attribute definition defined in the Database Attrib_Defns table 104. For example, the title data for each instance defined using attribute 1 is stored in table 108, such as CD1 Artist and CD3 Artist. While specific examples of attribute values are shown in FIG. 1, one of ordinary skill in the art will understand that the table 108 may include all attribute values of each database instance stored in table 106. In some embodiments, more than one table may be used to store the attribute values.

The data and metadata of the domain model is defined using terminology specific to the user's preferences. As a result, certain data and metadata stored in the repository relates to other data and metadata. For example, the metadata and data corresponding to CD1 is related. However, as illustrated in FIG. 1, the domain model metadata in tables 102 and 104 and the domain data stored in tables 106 and 108 is stored in a generic structure using loosely typed tables with no correspondence to the structure defined by the domain model. For example, the repository does not include a separate table for each database type with columns and rows including the instances and attribute values for each type. Rather, all of the metadata (database types and attribute definitions) and all of the data (database instances and database attribute values) are stored in different tables with no relational correspondence to related data and/or metadata as defined by the domain model.

There are various advantages to storing the metadata and data in the repository using the loosely typed, generic structure of tables 102, 104, 106, and 108. One advantage is that a repository using such a generic table structure allows the database types, their attributes, and their associations with one another to be dynamically modified. For example, hierarchical types can be supported with parent and child types. For example, attributes and associations of a database type may be declared on the database type and may be inherited by child types from parent types. Another advantage is that database type extensions may be supported to allow users to attach additional attributes and/or associations to existing database types. Hierarchical types and type extensions are both difficult to implement in a database schema that is not loosely typed. For example, a user query would need to be rewritten to not only execute against the user specified table but also against all tables representing child types. Furthermore, storing data in a Database Instances table 106 allows the system to perform batch insert, update, and/or delete operations for several database instances, regardless of their type. In the event type-specific tables were used where each type was stored in its own table, the insert, update, and delete operations would need to be broken up into multiple separate structured query language (SQL) statements, one for each instance type being processed.

Accordingly, various techniques are described herein for querying and using the metadata and data stored generically in the repository as if the data was stored in a structure corresponding to the domain model. For example, the metadata of the domain model may be used to dynamically generate database views and class objects that may be used to allow a user to query or otherwise utilize the domain data using domain-specific terms. Various embodiments relating to dynamic generation of database views and class objects will now be described below with reference to FIGS. 2-9.

Figure 2:
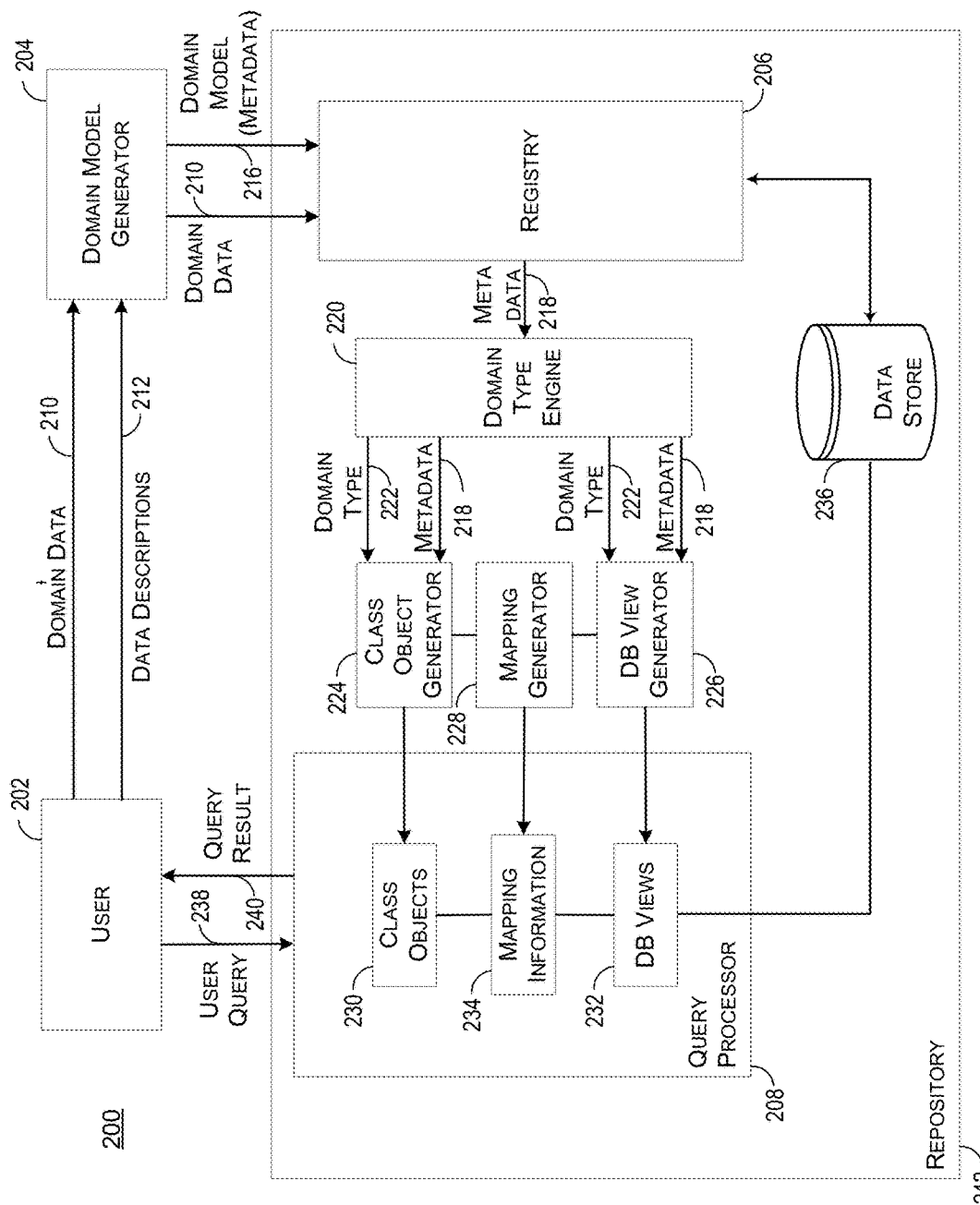
FIG. 2 is a block diagram illustrating an example of a system for storing and querying domain model metadata and domain data, in accordance with an embodiment.

FIG. 2 illustrates a system 200 for storing and querying domain model metadata and domain data, in accordance with an embodiment. Various components of system 200 may dynamically generate database views and class objects. The database views and class objects may be used by the system 200 to process a user query 238 that is in domain-specific terms for querying domain data 214 that is stored in a repository 242 using a generic, loosely typed storage structure, such as that illustrated in FIG. 1.

A database view includes a query statement that represents the generically stored domain data in a format specific to the domain model. FIG. 3 shows an example of a database view illustrated in a table format. While the database view 300 is shown as a table for illustrative purposes, there may not be any actual data or metadata stored in the database view 300. Rather, the database view 300 may include a query statement that represents certain subsets of the data stored in the repository 242. For example, the database view 300 may include a structured query language (SQL) statement that defines a logical or virtual table representing a subset of the repository data. The query statement defining the database view 300 may be stored in memory and may be used to retrieve the data that is represented by the view 300 from the repository 242.

The system 200 may dynamically generate a database view for each database type defined by the metadata stored in the Database Types table 102 illustrated in FIG. 1. For example, the database view 300 represents the data relating to the database instances of database Type 1 (CDs) and the attribute values of each of the Type 1 instances. The database view 300 represents the Type 1 instances and attribute values in a strongly typed, relational structure according to the domain model created by a user (e.g., user 202). For example, each row is dedicated to a particular instance of Type 1, such as CD1, CD2, and CD3. Further, each column is dedicated to an attribute value for the Type 1 instances. As a result, the database view 300 is structured in a way that all related data and metadata may be referenced in a single virtual table.

A class object may include object-oriented code that is mapped to data from relational databases using object-relational mapping. An example of a class object is a Java object or Java class. An application programming interface (API), such as a Java Persistence API (JPA), may be used to perform object-relational mapping. Examples of implementations of JPA may include EclipseLink, Hibernate, or Apache OpenJPA. The system 200 may map, store, update and retrieve data from relational databases to class objects and vice versa. JPA permits the system 200 to work directly with class objects rather than with SQL statements. The system 200 may dynamically generate a class object for each database type defined by the metadata stored in the Database Types table 102 illustrated in FIG. 1. The user query 238 may be in a JPA format. As explained in more detail below, the class objects may be used to translate the user query 238 from a JPA-related format (e.g., Java Persistence Query Language (JPQL) format, or the like) to a SQL format in order to query against a related database view. For example, JPA tooling, such as EclipseLink, may translate a user query (e.g., specified in a JPQL form) into a SQL query. JPQL is an object oriented query language with a syntax similar to SQL, but the user specifies the query in terms of Java class or Java object semantics. In one example, instead of referencing a relational table name in the FROM clause of a SQL query, the user may specify a Java class name in the FROM clause of the JQPL query. In another example, instead of referencing a relational column name in the SELECT or WHERE clause of a SQL query, the user may reference the field name(s) of the Java class for the JQPL query. In these examples, the SQL query translated from the user JPQL query may then be executed against a database view. Accordingly, two queries may be used to retrieve the data, the translated user query and the query statement defining the database view. The translated user query is used to query against the database view, and the query statement defining the database view is then used to retrieve the data in the repository 242 that is represented by the database view.

Returning to the system 200 of FIG. 2, a user 202 may create a domain model by defining various data descriptions 212 for a set of domain data 210 that the user wishes to store in a repository 242. A domain model generator 204 may receive as input the domain data 210 and/or the data descriptions 212. The domain model generator 204 may then generate a domain model 216. The domain model 216 includes metadata defining the domain data 210 according to the data descriptions 212 provided by the user 202. The domain model generator 204 may generate the domain model 216 using only the data descriptions 212 or using the domain data 210 and the data descriptions 212. An example of a domain model generator 204 may include JDeveloper by Oracle International Corporation.

The domain data 210 and the domain model 216 are provided from the domain model generator 204 to the repository 242 for further processing. For example, the domain data 210 and the domain model 216 may be registered in a registry 206. The domain data 210 and/or the domain model 216 may be stored in data store 236. Data store 236 may include persistent storage for storing the domain data 210 and metadata of domain model 216. The registry 216 may access the domain model 216 from within registry 216 and/or from data store 236 in order to provide metadata to various components of the system 200 for dynamically creating database views and class objects.

A domain type engine 220 may obtain metadata 218 from the registry 206 and may determine one or more domain types 218 defined by the metadata 218. For example, with reference to FIG. 1, the domain type engine 220 may determine that various types are defined, such as a Type 1—CD, a Type 2—DVD, and a Type 3—Record. One of ordinary skill in the art will understand that other exemplary domain types may be defined, such as a type for MP3s, a type for tapes, and/or the like.

The domain type engine 220 may provide the domain types 222 and the metadata 218 to the class object generator 224 and the database view generator 226. In some embodiments, metadata 218 may be obtained by the class object generator 224 and the database view generator 226 directly from the registry 206 and/or the data store 236. In such embodiments, the class object generator 224 and the database view generator 226 may determine the domain types 222 using the metadata 218. A database view and a class object may be generated for each of the domain types 222 determined by the domain type engine 220, the class object generator 224, and/or the database view generator 226. One of ordinary skill in the art will understand that database views and class objects may be generated for data and/or metadata other than domain database types. For example, a database view and a class object may be generated for each attribute definition or for a group of attribute definitions (e.g., all tracks of a CD). As another example, a database view and a class object may be generated for each instance of a domain database type (e.g., for CD1, DVD1, DVD3, Record3, and/or the like).

As described above, a database view includes a query statement (e.g., a SQL statement) that references certain subsets of the domain data 210 stored in the repository 242. For example, a subset of data may correspond to data relating to a domain database type, such as domain database Type 1—CD. Accordingly, the database view generator 226 may dynamically generate the database views 232 by generating a query statement for each domain database type defined by the metadata 218. The database view generator 226 may obtain the database instances and database attribute values corresponding to each domain database type using the metadata 218. For example, the database view generator 226 may receive the metadata 218, which may describe three instances of domain database Type 1—CD, including CD1, CD2, and CD3. The metadata 218 may also describe three attribute definitions for domain database Type 1—CD, including Attribute 1—Title, Attribute 2—Artist, and Attribute 3—Track. The database view generator 226 may then determine the corresponding attribute values for each instance of the domain database Type 1—CD. Using the metadata 218, the database view generator 226 may create one or more database view definition query statements, and may execute each query statement to create a database view 232. The query statement defining a database view references the underlying data (database instances and database attribute values) for the particular domain database type. The database views represent the instances and attribute values of each domain database type in a relational structure specific to the domain model created by the user 202. For example, with reference to FIG. 3, each row of a virtual table representing database view 300 may be dedicated to a particular instance of a domain type (e.g. instances CD1, CD2, and CD3). Further, each column of the virtual table may be dedicated to a different attribute value relating to the instances of the domain type.

In some embodiments, the query statement includes a SQL statement. FIG. 4 illustrates an example of a SQL statement 400 defining a database view. The SQL statement 400 may be executed against the Database Instances and Attrib_Values tables stored in the repository 242. Filtering all the Database Instances rows to only those corresponding to a certain domain database type may be done through the "i.TYPE_UUID IN" clause 402 of the SQL statement 400. The "i.TYPE_UUID IN" clause 402 specifies the identifier(s) for the domain type or any child types. The identifier(s) may include a universally unique identifier (UUID). Common attributes associated with instances of all domain types, like NAME, NAMESPACE, INSTANCE_UUID may have dedicated columns in the Database Instances table and are returned in the SELECT portion 404 of the SQL statement 400. Using the example of FIG. 1, common attributes may include Title or Artist. Other attributes that are specific to a particular domain type in the domain model may be given generic names like AD1, AD2, etc. and may be filtered from the Attrib_Values table though a "ATTRDEFN_UUID=" clause, such as "ATTRDEFN_UUID=" clause 406. By knowing the identifiers (UUIDs) associated with a domain type and its attributes, the system 200 can filter the Instances and Attribute Values data down to just those rows associated with instances of a particular domain type. As a result, the database view is a strongly typed projection of the logically typed data stored in the Database Instances and Attrib_Values tables of the repository 242.

The class object generator 224 may dynamically generate a class object for each domain database type defined by the metadata 218. Once the object classes and database views are generated, a mapping generator 228 may generate mapping information between each database view and each corresponding class object. Accordingly, a database view, a class object, and mapping information may be generated for each domain database type defined by the metadata 218. In some embodiments, the database views, class objects, and mapping information may be generated when the system 200 is first started or when a new domain model is created or updated.

The query statements defining the database views 232, the class objects 230, and the mapping information 234 may be registered with the query processor 208 and stored in the query processor 208, the registry 206, and/or the data store 236. The query processor 208 may retrieve the domain data 210 that is represented by the database views 232 from the registry 206 and/or the data store 236.

The database views 232, class objects 230, and mapping information 234 may be used by the query processor 208 to process the user query 238 in order to retrieve the data from the repository 242 that corresponds to the user query 238. The user query 238 may be in a JPA format in terms specific to the domain model created by the user 202. For example, the user query 238 may specifically reference a domain database type, such as Type 1—CD. The query processor 208 may determine the domain type referenced in the user query 238. The query processor 208 may then match the type or types referenced in the query string against a set of registered class objects (e.g., registered in the query processor 208 and/or the registry 206). For example, the query processor 208 may determine a particular class object that corresponds to the determined domain type. As one example, the query processor 208 may retrieve a class object called Type 1—CD that corresponds to the domain Type 1—CD. The query processor 208 may then determine that the class object has mapping information associated with it that references a particular database view. Using the mapping information, the query processor 208 can determine the database view that corresponds to the class object. The query processor 208 can use the determined class object to translate the user query 238 from the JPA format to a SQL format. The query processor 208 can then run the translated SQL query against the database view in order to retrieve the data that is requested by the user query 238. For example, the translated SQL query may be translated by the query processor 208 into a SQL query against the underlying table in the repository 242 using the definition SQL of the database view.

In some embodiments, the portion of the query statement defining the database view that is relevant to the user query 238 is used to retrieve the data in the repository 242 that is represented by the database view and requested by the user query 238. For example, with reference to FIG. 3, a SQL defining a database view limits user queries to only those rows within the underlying Database Instances table 106 and Database Attrib_Values table 108 that are relevant to the domain type that the database view represents. Any criteria specified in the user query (e.g. WHERE Type1.title='foo') adds further constraints onto that SQL to match specific instances. As one example, a query against the database view 300 in FIG. 3, a translated SQL query specifying "SELECT title FROM Type1" may be translated by the query processor 208 into a query against the underlying Database Instances table 106 and Database Attrib_Values table 108. The query is constrained to the rows relevant to Type1 and Type1 Title (e.g., CD1 Title, CD2 Title, CD3 Title). As another example, if the database view includes a reference to all instance and attribute data that relates to a Type 1—CD, but the user query 238 only requests data relating to a particular instance (e.g., CD1), only the portion of the database view query statement relating to the instance is used to retrieve data from the repository 242. Once the data is retrieved, the query processor 208 may provide the requested data to the user 202 as a query result 240.

Accordingly, the system 200 allows a user 202 to query the domain data that is generically stored in the repository 242 using terms that are specific to the domain model. As a result, the system 200 achieves the benefits of storing the domain data in a loosely typed structure while not preventing users from easily searching their domain data.

Figure 5:
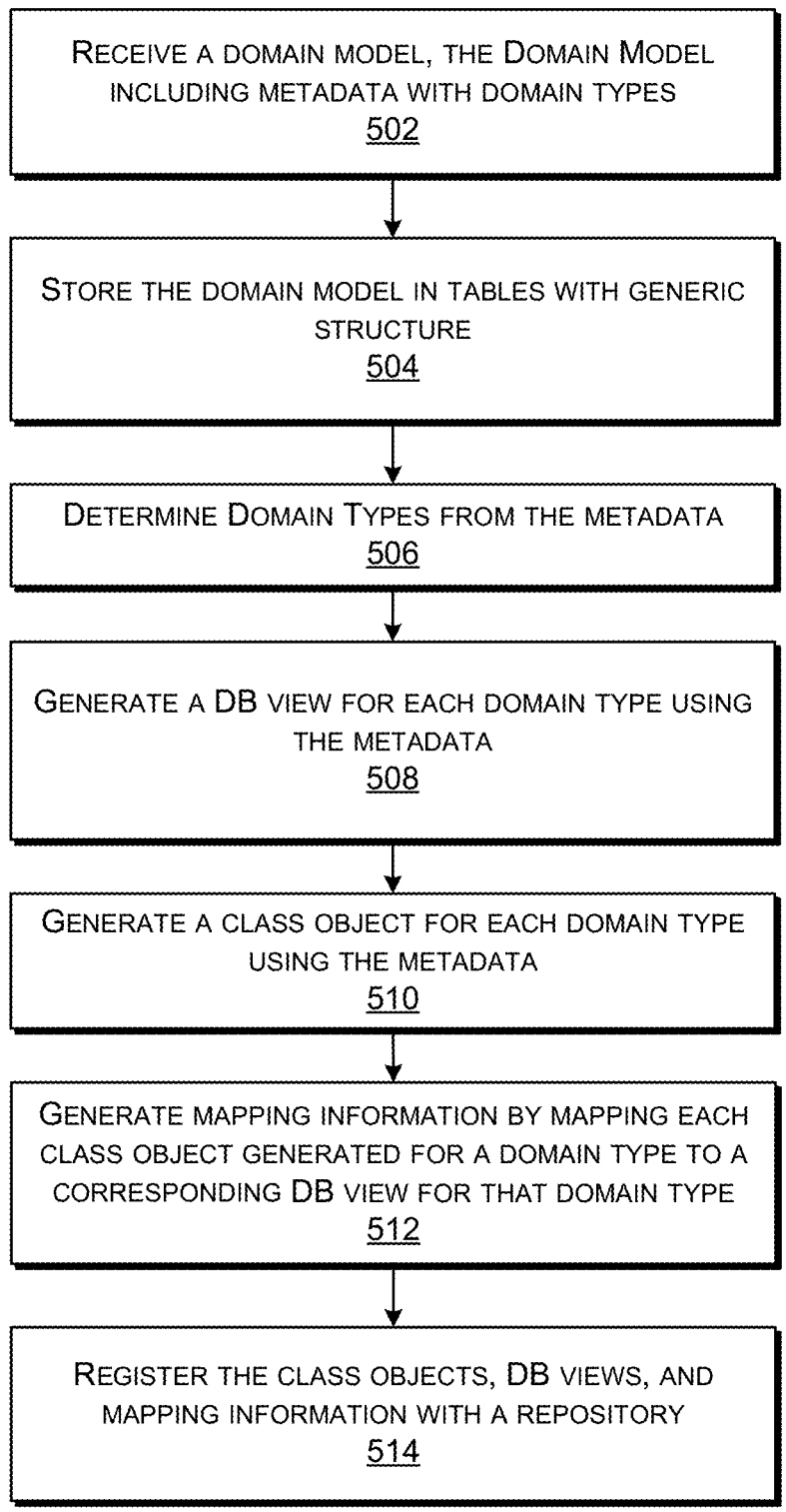
FIG. 5 is a flowchart illustrating an embodiment of a process for generating and registering database views, class objects, and mapping information.

FIG. 5 illustrates an embodiment of a process 500 for generating and registering database views, class objects, and mapping information. Process 500 is illustrated as a logical flow diagram, the operation of which represent a sequence of operations that can be implemented in hardware, computer instructions, or a combination thereof. In the context of computer instructions, the operations represent computer-executable instructions stored on one or more machine-readable or computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable or computer-readable storage medium, for example, in the form of a computer program comprising a plurality of instructions executable by one or more processors. The machine-readable or computer-readable storage medium may be non-transitory.

Figure 8:
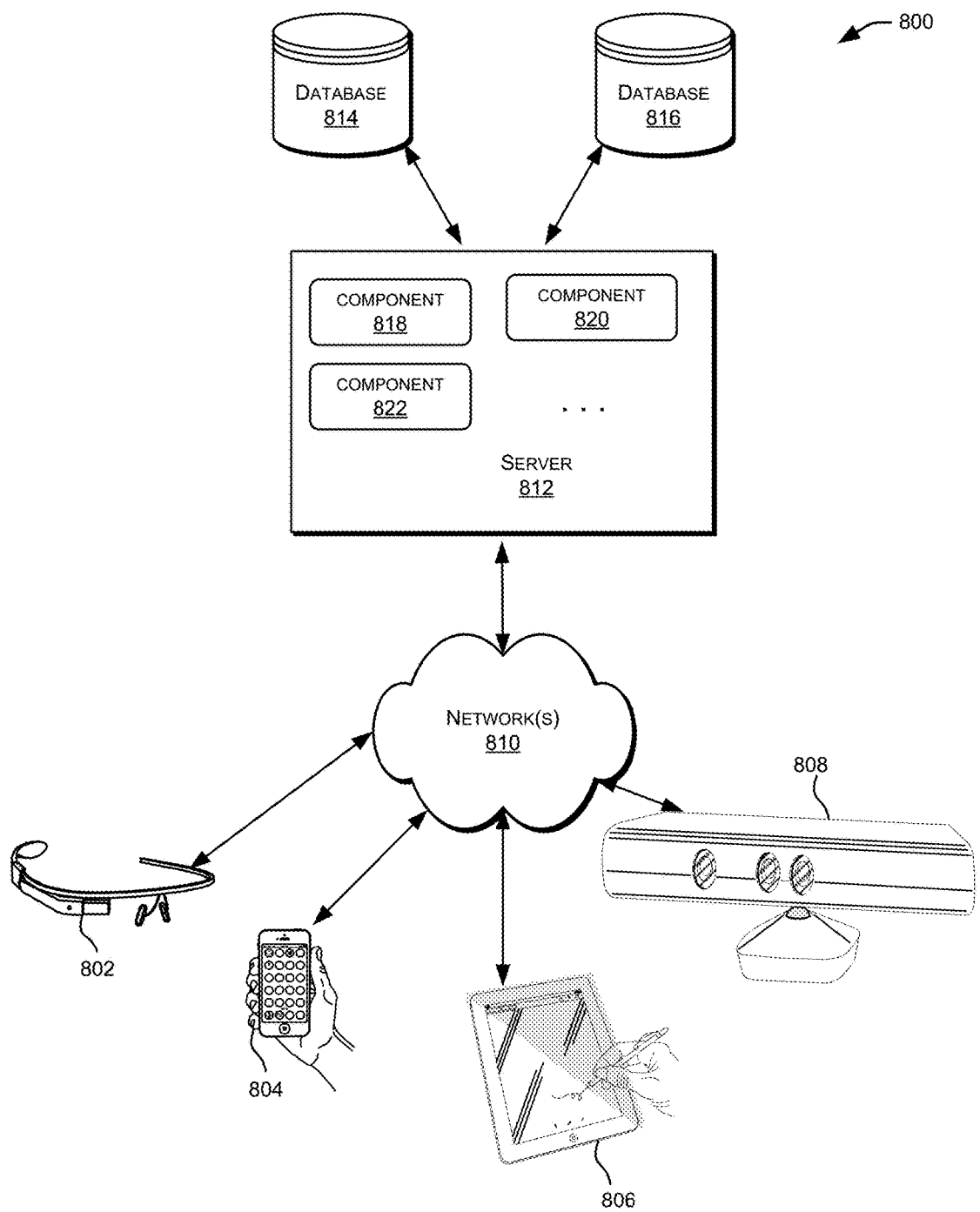
FIG. 8 depicts a simplified diagram of a distributed system for implementing one or more of the embodiments.
Figure 9:
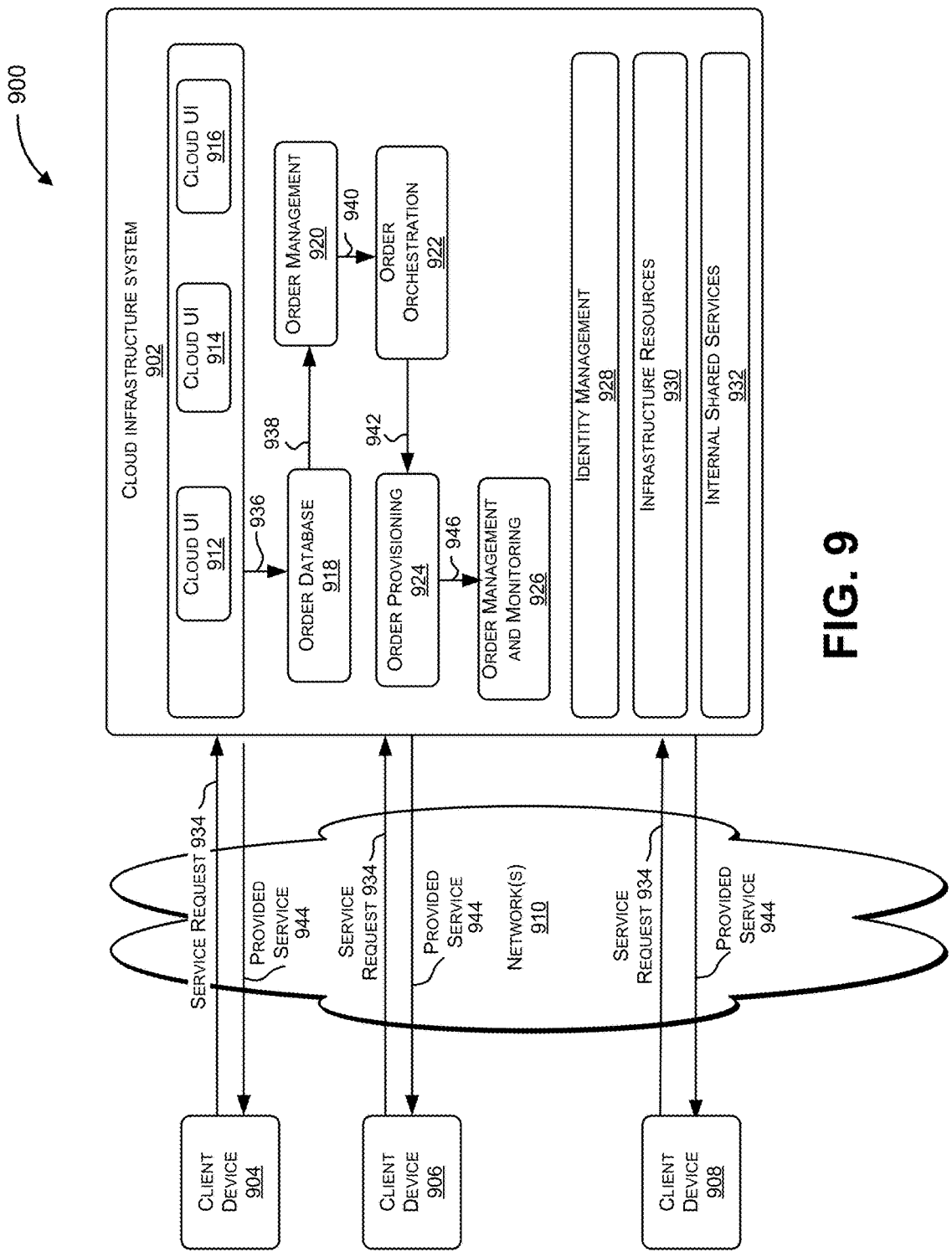
FIG. 9 is a simplified block diagram of components of a system environment by which services provided by the components of an embodiment system may be offered as cloud services, in accordance with an embodiment of the present disclosure.
Figure 10:
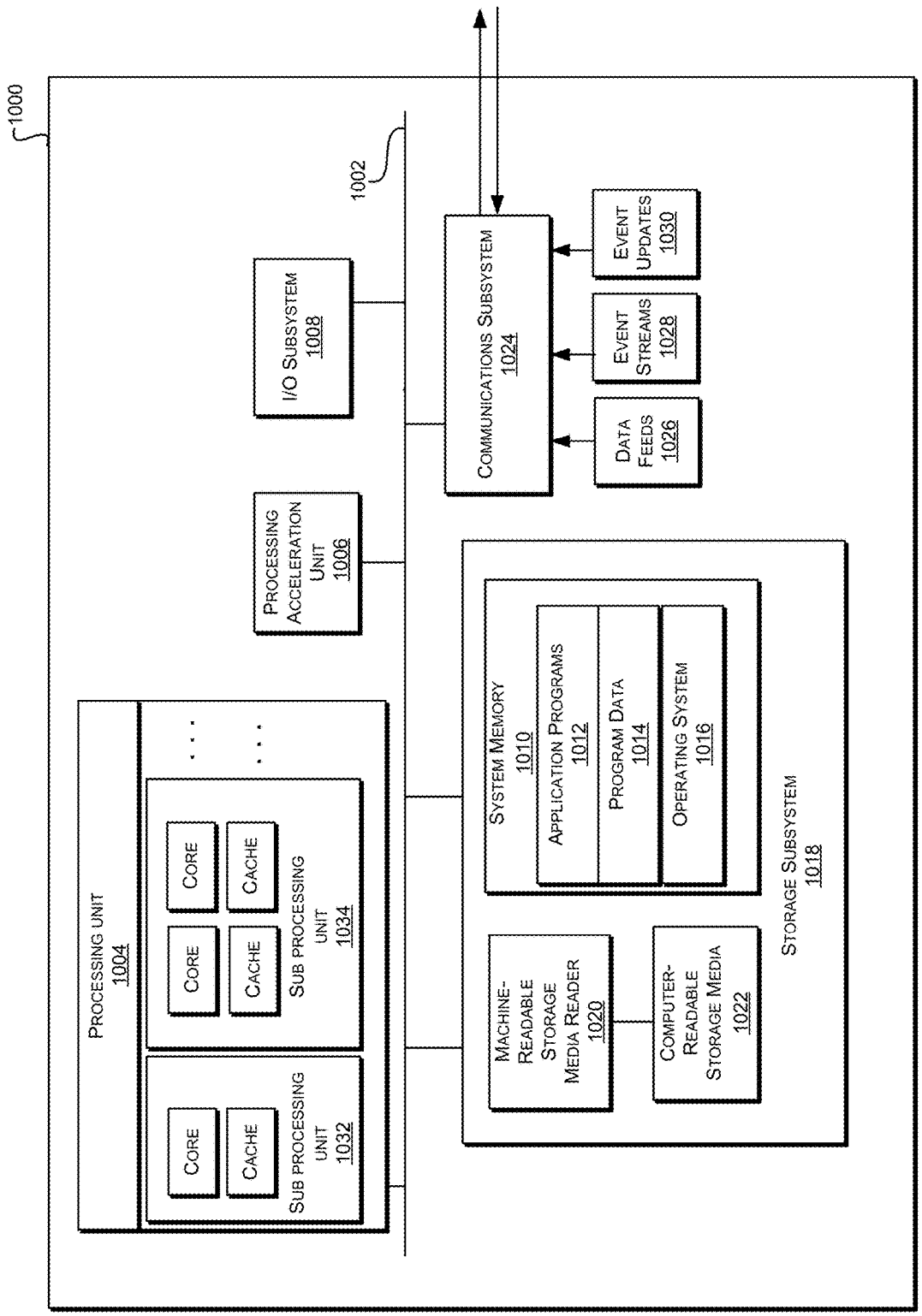
FIG. 10 illustrates an exemplary computer system, in which various embodiments of the present invention may be implemented.

In some aspects, the process 500 may be performed by a computing device, such as the server 812 or one or more of the client computing devices 802, 804, 806, 808 shown in FIG. 8, the cloud infrastructure system 902 or one or more client computing devices 904, 906, and 908 shown in FIG. 9, or the computer system 1000 shown in FIG. 10. The computing device may perform the process 500 by implementing all or parts of the system 200 shown in FIG. 2.

Process 500 may begin at 502 by receiving a domain model. The domain model includes metadata with domain types that may be defined and/or selected by a user. For example, the domain types may be based on data descriptions provided by the user. The domain model may be received, for example, by the repository 242 from the domain model generator 204. At 504, the domain model is stored in tables with a generic structure. For example, the repository 242 may store the domain model in a loosely typed generic format that does not correspond to the domain model.

At 506, the process 500 includes determining domain types from the metadata. For example, the domain type engine 220 may obtain the metadata of the domain model and may determine each domain type defined by the metadata. At 508, the process 500 includes generating a database view for each domain type using the metadata. For example, the domain type engine 220 may provide the domain type 222 and the metadata 218 to the database view generator 226. The database view generator 226 may then generate a database view for each domain type using the domain type 222 and the metadata 218, as described above with respect to FIG. 2. An example of a database view may include the database view 300 shown in FIG. 3. One of ordinary skill in the art will understand that the database views may be generated for data and/or metadata other than domain database types. For example, a database view may be generated for each attribute definition or for a group of attribute definitions. As another example, a database view may be generated for each instance of a domain database type.

At 510, the process 500 includes generating a class object for each domain type using the metadata. For example, the domain type engine 220 may provide the domain type 222 and the metadata 218 to the class object generator 224. The class object generator 224 may generate a class object for each domain type using the domain type 222 and the metadata 218, as described above with respect to FIG. 2. One of ordinary skill in the art will understand that the class objects may be generated for data and/or metadata other than domain database types. For example, a class object may be generated for each attribute definition or for a group of attribute definitions. As another example, a class object may be generated for each instance of a domain database type.

At 512, the process 500 includes generating mapping information by mapping each class object generated for a domain type to a corresponding database view for that domain type. For example, once the object classes and database views are generated for each domain type, the mapping generator 228 may generate mapping information between each database view and each corresponding class object. In some embodiments, the database views, class objects, and mapping information may be generated when a repository system (e.g., repository 242 of system 200) is first started or when a new domain model is created or updated.

At 514, the process 500 includes registering the class objects, database views, and mapping information with a repository. For example, the database views, the class objects, and the mapping information may be registered with the query processor 208 and stored in the query processor 208, the registry 206, and/or the data store 236. The query processor 208 may retrieve the domain data that is referenced by the database views 232 from the registry 206 and/or the data store 236.

Figure 6:
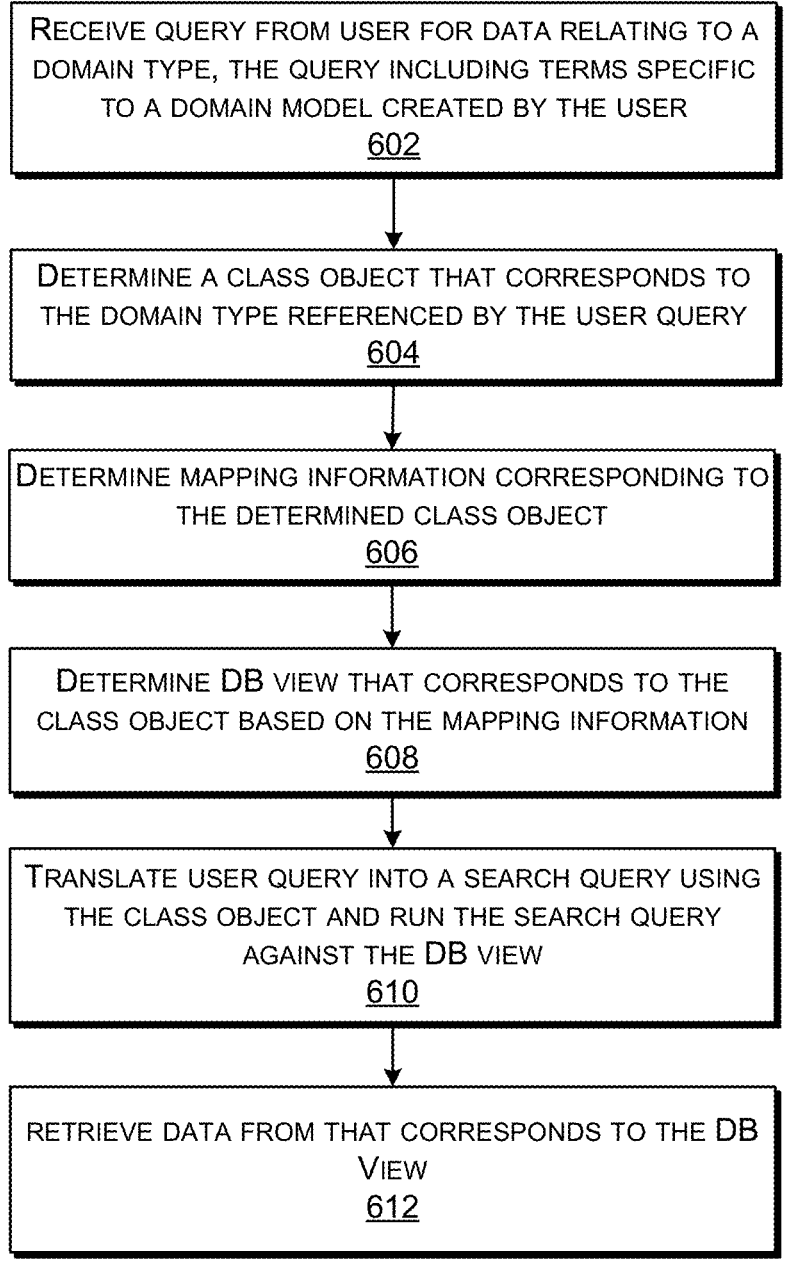
FIG. 6 is a flowchart illustrating an embodiment of a process for using database views, class objects, and mapping information for processing a user query.

FIG. 6 illustrates an embodiment of a process 600 for using database views, class objects, and mapping information for processing a user query. Process 600 is illustrated as a logical flow diagram, the operation of which represent a sequence of operations that can be implemented in hardware, computer instructions, or a combination thereof. In the context of computer instructions, the operations represent computer-executable instructions stored on one or more machine-readable or computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable or computer-readable storage medium, for example, in the form of a computer program comprising a plurality of instructions executable by one or more processors. The machine-readable or computer-readable storage medium may be non-transitory.

In some aspects, the process 600 may be performed by a computing device, such as the server 812 or one or more of the client computing devices 802, 804, 806, 808 shown in FIG. 8, the cloud infrastructure system 902 or one or more client computing devices 904, 906, and 908 shown in FIG. 9, or the computer system 1000 shown in FIG. 10. The computing device may perform the process 600 by implementing all or parts of the system 200 shown in FIG. 2.

Process 600 may begin at 602 by receiving a query from a user for data relating to a domain type. The query may include terms that are specific to a domain model created by the user. For example, the user query may be in a JPA format that specifically references a domain type (e.g., Type 1—CD). The query processor 208 may receive the user query and may process the user query to determine the domain type referenced by the query. At 604, the process 600 may determine a class object that corresponds to the domain type referenced by the user query. For example, the query processor 208 may retrieve a class object called Type 1—CD that corresponds to the domain Type 1—CD. The query processor 208 may retrieve the class object from short term memory (e.g., flash memory, or the like) within the query processor 208, from the registry 206, and/or from the data store 236.

At 604, the process 600 includes determining mapping information corresponding to the determined class object. At 606, the process 600 includes determining a database view that corresponds to the class object based on the mapping information. For example, the query processor 208 may determine that the determined class object has mapping information associated with it that references a particular database view. Using the mapping information, the query processor 208 can determine the database view that corresponds to the class object.

The class object and database view can then be used to process the user query in order to retrieve data that is requested by the query. For example, at 606, the process 600 includes translating the user query into a search query using the class object and running the search query against the database view. For example, the query processor 208 can use the determined class object to translate the user query from a JPA format to a SQL format. At 608, the process 600 includes retrieving data that corresponds to the database view. For example, the query processor 208 can run the translated SQL query against the database view in order to retrieve the data that is requested by the user query. The portion of the query statement defining the database view that is relevant to the user query may then be used to retrieve the data from the underlying tables in the repository that is represented by the database view and requested by the user query. For example, the database view may include a reference to all instance and attribute data that relates to a domain Type 1—CD, but the user query may only request data relating to a particular instance of the domain type (e.g., CD1). In this example, only the portion of the query statement relating to the instance is used to retrieve data from the underlying tables of the repository. Once the data is retrieved, the query processor may provide the data to the user as a query result (e.g., query result 240).

Figure 7:
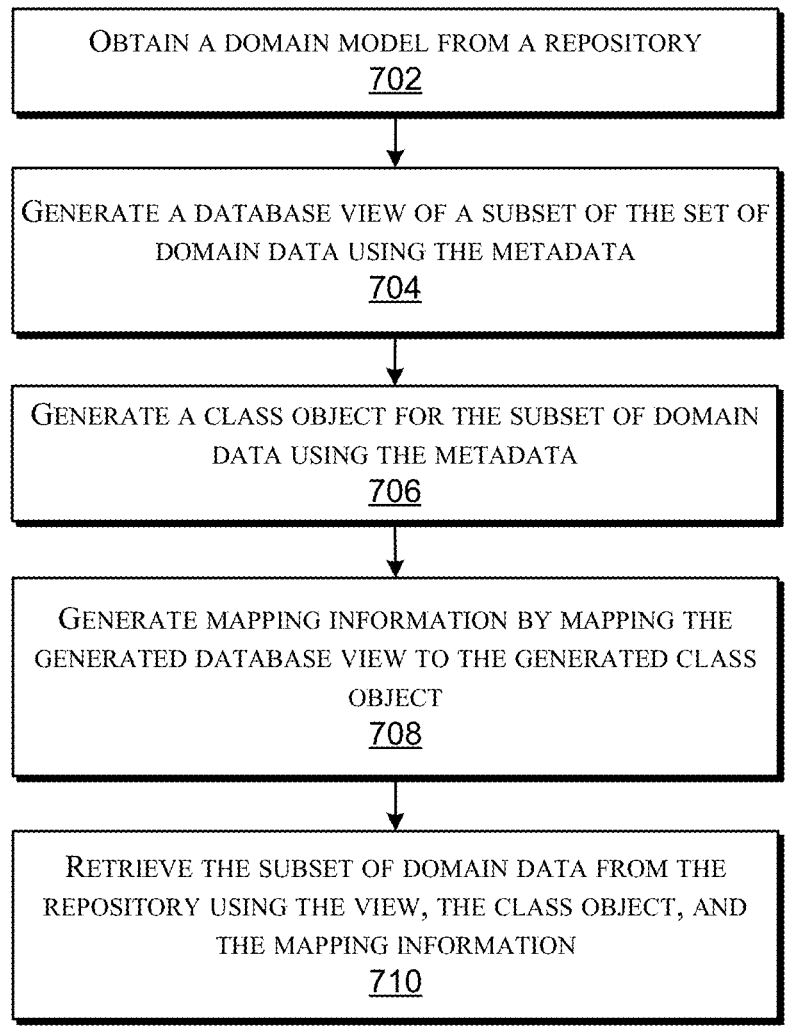
FIG. 7 is a flowchart illustrating an embodiment of a process for retrieving domain data using database views, class objects, and mapping information.

FIG. 7 illustrates an embodiment of a process 700 for retrieving domain data using database views, class objects, and mapping information. Process 700 is illustrated as a logical flow diagram, the operation of which represent a sequence of operations that can be implemented in hardware, computer instructions, or a combination thereof. In the context of computer instructions, the operations represent computer-executable instructions stored on one or more machine-readable or computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable or computer-readable storage medium, for example, in the form of a computer program comprising a plurality of instructions executable by one or more processors. The machine-readable or computer-readable storage medium may be non-transitory.

In some aspects, the process 700 may be performed by a computing device, such as the server 812 or one or more of the client computing devices 802, 804, 806, 808 shown in FIG. 8, the cloud infrastructure system 902 or one or more client computing devices 904, 906, and 908 shown in FIG. 9, or the computer system 1000 shown in FIG. 10. The computing device may perform the process 700 by implementing all or parts of the system 200 shown in FIG. 2.

Process 700 may begin at 702 by obtaining a domain model from a repository, the domain model including metadata corresponding to a set of domain data stored in the repository. For example, the domain model (e.g., domain model 216) may be generated by the domain model generator 204 in response to a user defining and/or selecting data descriptions 212 for domain data 210. In some embodiments, the metadata of the domain model defines one or more domain types and one or more attribute definitions for the set of domain data stored in the repository. The one or more domain types and one or more attribute definitions may be based on the user's defined and/or selected data descriptions 212 for the domain data 210. The domain model may be registered and/or stored in the registry 206 and/or the data store 236 of the repository 242. The domain model may then be obtained from the registry 206 and/or the data store 236 by the class object generator 224, the database view generator 226, and/or the domain type engine 220. For example, the class object generator 224 and the database view generator 226 may retrieve the metadata 218 of the domain model 216 directly from the registry 206 or the data store 236. As another example, the domain type engine 220 may obtain the domain model from the registry 206 or the data store 236. The domain type engine 220 may then provide domain types and metadata to the class object generator 224 and the database view generator 226.

The set of domain data is stored in the repository in a generic structure with no correspondence to the domain model. For example, the domain model may be stored in tables within the repository with a loosely typed generic format that does not correspond to the domain model. As described above, the repository tables 102, 104, 106, and 108 of FIG. 1 illustrate an example of tables in a loosely typed generic format, where the repository does not include a separate table for each database type with columns and rows including the instances and attribute values for each type. Rather, all of the metadata (database types and attribute definitions) and all of the data (database instances and database attribute values) are stored in different tables with no relational correspondence to related data and/or metadata as defined by the domain model.

At 704, the process 700 includes generating a database view of a subset of the set of domain data using the metadata. For example, the database view generator 226 may generate a database view for the subset of data using the metadata, as described above with reference to FIGS. 2-4. An example of a database view may include the database view 300 shown in FIG. 3. In some embodiments, the database view includes a query statement referencing the subset of domain data. In some embodiments, the query statement includes a structured query language (SQL) statement, such as the SQL statement 400 described above with reference to FIG. 4. The database view represents the subset of domain data as a virtual table with a specific structure corresponding to the domain model. As described above, the database view 300 of FIG. 3 illustrates an example of representing the data as a virtual table in a strongly typed, relational structure. For example, the database view 300 represents the Type 1 instances and attribute values in a strongly typed, relational structure specific to the domain model created by a user. Each row is dedicated to a particular instance of Type 1, such as CD1, CD2, and CD3. Further, each column is dedicated to an attribute value for the Type 1 instances. As a result, the database view provides a strongly typed projection of the logically typed data stored in the tables of the repository.

In some embodiments, the subset of data may include data relating to a domain database type defined by the metadata of the domain model, such as domain database Type 1—CD described above with reference to FIG. 1. For example, using the domain type 222 and the metadata 218, the database view generator 226 may dynamically generate the database view for the domain type, as described above with respect to FIG. 2. One of ordinary skill in the art will understand that the database view may be generated for data and/or metadata other than domain database types. For example, a database view may be generated for an attribute definition or for a group of attribute definitions (e.g., all tracks of a CD). As another example, a database view may be generated for an instance of a domain database type (e.g., for first CD of a CD Type).

At 706, the process 700 includes generating a class object for the subset of domain data using the metadata. In some embodiments, the subset of data may include data relating to a domain database type defined by the metadata of the domain model. In some embodiments, the process 700 may include generating a class object and a database view for each domain type of the one or more domain types defined by the metadata of the domain model. For example, the class object generator 224 may generate a class object for each domain type using the domain type 222 and the metadata 218, as described above with respect to FIG. 2. One of ordinary skill in the art will understand that the class objects may be generated for data and/or metadata other than domain database types. For example, a class object may be generated for each attribute definition or for a group of attribute definitions. As another example, a class object may be generated for each instance of a domain database type. As described above, a class object may include object-oriented code that is mapped to data from relational databases using object-relational mapping. An example of a class object is a Java object or Java class. In some embodiments, Java Persistence API (JPA) may be used to perform object-relational mapping. JPA may permits the process 700 to work directly with class objects rather than with SQL statements. The process 700 may use JPA to map, store, update, and retrieve data from relational databases to class objects and vice versa.

At 708, the process 700 includes generating mapping information by mapping the generated database view to the generated class object. For example, once the object classes and database views are generated for each domain type, the mapping generator 228 may generate mapping information between each database view and each corresponding class object. In some embodiments, the database views, class objects, and mapping information may be generated when repository system (e.g., repository 242 of system 200) is first started or when a new domain model is created or updated. In some embodiments, the class objects, database views, and mapping information may be registered with a repository. For example, the database views, the class objects, and the mapping information may be registered with the query processor 208 and stored in the query processor 208, the registry 206, and/or the data store 236.

At 710, the process 700 includes retrieving the subset of domain data from the repository using the database view, the class object, and the mapping information. In some embodiments, the database view, the class object, and the mapping information may be used (e.g., by the query processor 208) to process a user query in order to retrieve the subset of domain data from the repository that corresponds to the database view. For example, the process 700 may include receiving a user query for the subset of domain data and determining a domain type from the user query. The domain type may correspond to a domain type of the subset of domain data defined by the metadata. The process 700 may further include determining the class object for the subset of data based on the domain type determined from the user query and determining the database view of the subset of data using the mapping information between the class object and the database view. The process 700 may further include performing a query on the database view to retrieve the subset of domain data from the repository. In some embodiments, the process 700 may include translating the user query into a structured query language statement using the class object, wherein performing the query on the database view includes performing the structured query language statement on the database view to retrieve the subset of domain data from the repository. In some embodiments, once the query (e.g., the translated query) is performed on the database view, the query statement representing the database view is then performed on the set of domain data stored in the repository in order to retrieve the subset of domain data referenced by the database view. For example, the query processor 208 may retrieve the subset of domain data that is referenced by the database view from the registry 206 and/or the data store 236. The process 700 may further include outputting the subset of domain data as a result of the user query. For example, the subset of domain data may be output to the user as a query result (e.g., query result 240).

The user query may be in a JPA format in terms specific to the domain model created by the user. For example, the user query may reference a domain database type, such as Type 1-CD (see FIG. 1). The process 700 may determine the domain type referenced in the user query and may determine the class object that corresponds to the domain type referenced in the user query. For example, the query processor 208 may retrieve a class object called Type 1—CD that corresponds to the domain Type 1—CD. The class objects may be used to translate the user query from a JPA format to a SQL format in order to query against a related database view. As explained above, the process 700 may determine that the class object has mapping information associated with it that references a particular database view. Using the mapping information, the process 700 can determine the database view that corresponds to the class object. The process 700 can use the class objects to translate the user query from the JPA format to a SQL format. The query processor 208 can run the translated SQL query against the database view. Once the database view is queried, the process 700 may then use the query statement defining the database view to retrieve the subset of data in the repository that is represented by the database view.

The processes 500, 600, and 700 allow a user to query the domain data that is generically stored in the repository using terms that are specific to the domain model created by the user. As a result, the processes 500, 600, and 700 achieve the benefits described above relating to storing the domain data in a loosely typed structure while not preventing users from easily searching their domain data using domain specific terms.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible, non-transitory computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements that may be stored within a non-transitory machine-readable storage medium, such as system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible, non-transitory machine-readable storage media 1022 for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1018 may also include a non-transitory machine-readable storage media reader 1020 that can further be connected to machine-readable storage media 1022. Together and, optionally, in combination with system memory 1010, machine-readable storage media 1022 may comprehensively represent remote, local, fixed, and/or removable storage devices plus storage media for temporarily and/or more permanently containing, storing, transmitting, and retrieving computer-readable information.

Machine-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1000.

By way of example, machine-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Machine-readable storage media 1022 may include, but is not limited to, Zip® drives, flash memory cards, universal serial bus (USB) flash drives, secure digital (SD) cards, DVD disks, digital video tape, and the like. Machine-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated machine-readable storage media may provide non-volatile storage of machine-readable or computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method, comprising:
    obtaining, by a computing device, a domain model from a repository, wherein the domain model is generated to include metadata corresponding to a set of domain data stored in the repository and is generated in accordance with an input data description for the set of domain data, wherein the metadata of the domain model defines one or more domain types and one or more attribute definitions for the set of domain data stored in the repository;
    generating, by the computing device, a database view of a subset of the set of domain data using the metadata, wherein the database view is generated based on a query statement referencing the subset of domain data and wherein the database view defines a table representing the subset of domain data;
    generating, by the computing device, a class object for the subset of domain data using the metadata;
    generating, by the computing device, mapping information by mapping the generated database view to the generated class object;
    retrieving, by the computing device, the subset of domain data from the repository using the database view, the class object, and the mapping information;
    receiving, by the computing device, a user query for the subset of domain data;
    determining, by the computing device, a domain type from the user query, the domain type corresponding to a domain type of the subset of domain data defined by the metadata;
    determining, by the computing device, the class object for the subset of data based on the domain type determined from the user query;
    determining, by the computing device, the database view of the subset of data using the mapping information between the class object and the database view;
    performing a query on the database view to retrieve the subset of domain data from the repository;
    translating the user query into a structured query language statement using the class object, wherein performing the query on the database view includes performing the structured query language statement on the database view to retrieve the subset of domain data from the repository; and
    outputting the subset of domain data as a result of the user query.

2. The method of claim 1, further comprising:
    generating a class object and a database view for each domain type of the one or more domain types.

3. The method of claim 1, wherein the query statement is performed on the set of domain data stored in the repository to retrieve the subset of domain data referenced by the database view.

4. The method of claim 3, wherein the query statement includes a structured query language (SQL) statement.

5. The method of claim 1, wherein the set of domain data is stored in the repository in a generic structure with no correspondence to the domain model, and wherein the database view represents the subset of domain data as a virtual table with a specific structure corresponding to the domain model.

6. The method according to claim 1, further comprising translating the user query from a first type data format to a second type data format.

7. The method according to claim 6, wherein the first type data format is a loosely typed data format.

8. The method according to claim 1, wherein the input data description for the set of domain data is defined by a user.

9. A system, comprising:
    a memory storing a plurality of instructions; and
    one or more processors configurable to:
        obtain a domain model from a repository, the domain model is generated to include metadata corresponding to a set of domain data stored in the repository and is generated in accordance with an input data description for the set of domain data, wherein the metadata of the domain model defines one or more domain types and one or more attribute definitions for the set of domain data stored in the repository;
        generate a database view of a subset of the set of domain data using the metadata, wherein the database view is generated based on a query statement referencing the subset of domain data and wherein the database view defines a table representing the subset of domain data;
        generate a class object for the subset of domain data using the metadata;
        generate mapping information by mapping the generated database view to the generated class object;
        retrieve the subset of domain data from the repository using the database view, the class object, and the mapping information;
        receive a user query for the subset of domain data;
        determine a domain type from the user query, the domain type corresponding to a domain type of the subset of domain data defined by the metadata;
        determine the class object for the subset of data based on the domain type determined from the user query;
        translate the user query into a structured query language query using the class object;
        determine the database view of the subset of data using the mapping information between the class object and the database view;
        perform the structured query language query on the database view to retrieve the subset of domain data from the repository; and output the subset of domain data as a result of the user query.

10. The system of claim 9, wherein the one or more processors are further configurable to:
generate a class object and a database view for each domain type of the one or more domain types.

11. The system of claim 9, wherein the query statement includes a structured query language statement performed on the set of domain data stored in the repository to retrieve the subset of domain data referenced by the database view.

12. The system of claim 9, wherein the set of domain data is stored in the repository in a generic structure with no correspondence to the domain model, and wherein the database view represents the subset of domain data as a virtual table with a specific structure corresponding to the domain model.

13. A non-transitory machine-readable medium storing a plurality of instructions executable by one or more processors, the plurality of instructions comprising:
instructions that cause the one or more processors to obtain a domain model from a repository, the domain model is generated to include metadata corresponding to a set of domain data stored in the repository and is generated in accordance with an input data description for the set of domain data, wherein the metadata of the domain model defines one or more domain types and one or more attribute definitions for the set of domain data stored in the repository;
instructions that cause the one or more processors to generate a database view of a subset of the set of domain data using the metadata, wherein the database view is generated based on a query statement referencing the subset of domain data and wherein the database view defines a table representing the subset of domain data;
instructions that cause the one or more processors to generate a class object for the subset of domain data using the metadata;
instructions that cause the one or more processors to generate mapping information by mapping the generated database view to the generated class object;
instructions that cause the one or more processors to retrieve the subset of domain data from the repository using the database view, the class object, and the mapping information;
instructions that cause the one or more processors to receive a user query for the subset of domain data;
instructions that cause the one or more processors to determine a domain type from the user query, the domain type corresponding to a domain type of the subset of domain data defined by the metadata;
instructions that cause the one or more processors to determine the class object for the subset of data based on the domain type determined from the user query;
instructions that cause the one or more processors to translate the user query into a structured query language query using the class object;
instructions that cause the one or more processors to determine the database view of the subset of data using the mapping information between the class object and the database view;
instructions that cause the one or more processors to perform the structured query language query on the database view to retrieve the subset of domain data from the repository; and
instructions that cause the one or more processors to output the subset of domain data as a result of the user query.

14. The machine-readable medium of claim 13, wherein the plurality of instructions further comprise:
instructions that cause the one or more processors to generate a class object and a database view for each domain type of the one or more domain types.

15. The machine-readable medium of claim 13, wherein the query statement includes a structured query language statement performed on the set of domain data stored in the repository to retrieve the subset of domain data referenced by the database view.

16. The machine-readable medium of claim 13, wherein the set of domain data is stored in the repository in a generic structure with no correspondence to the domain model, and wherein the database view represents the subset of domain data as a virtual table with a specific structure corresponding to the domain model.

* * * * *

UNITED STATES PATENT AND TRADEMARK OFFICE
CERTIFICATE OF CORRECTION

PATENT NO. : 9,934,258 B2
APPLICATION NO. : 14/230627
DATED : April 3, 2018
INVENTOR(S) : Fuglsang et al.

It is certified that error appears in the above-identified patent and that said Letters Patent is hereby corrected as shown below:

In Column 8, Line 56, delete "JQPL" and insert -- JPQL --, therefor.

In Column 8, Line 59, delete "JQPL" and insert -- JPQL --, therefor.

Signed and Sealed this
Eleventh Day of September, 2018

Andrei Iancu
*Director of the United States Patent and Trademark Office*